Feb. 9, 1926.   1,572,004
J. A. GASKILL
WEEDING ATTACHMENT FOR HARROWS
Filed August 8, 1925
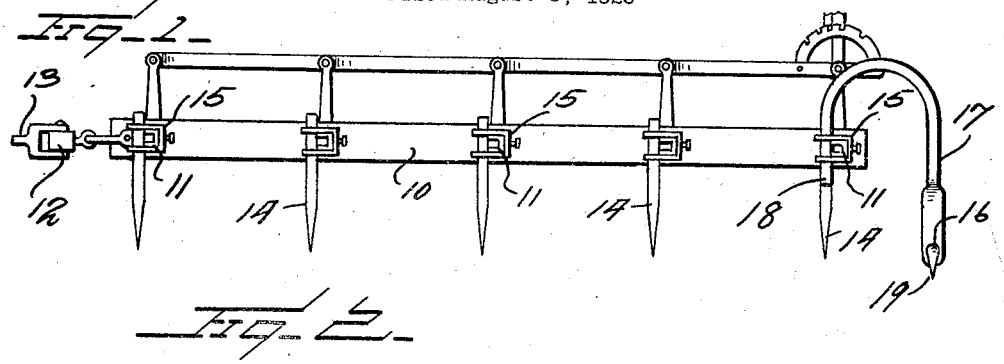
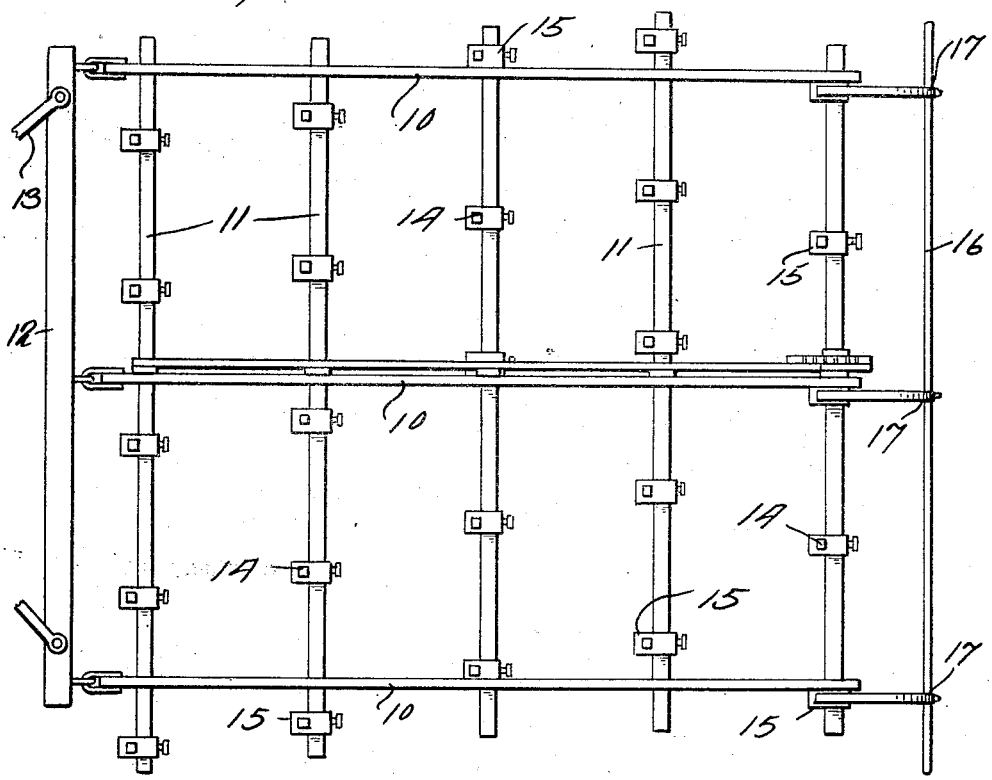
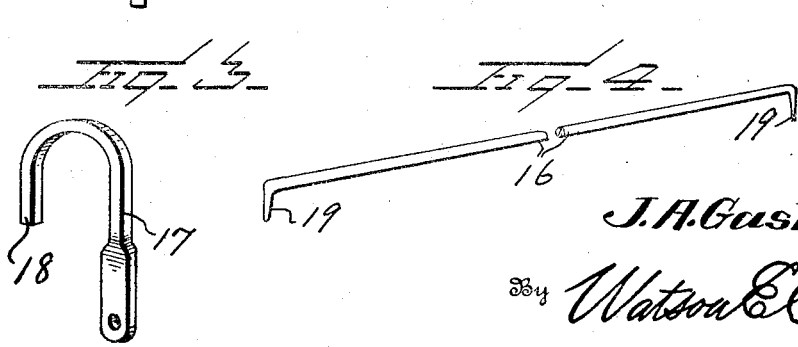
Inventor
J. A. Gaskill
By Watson E. Coleman
Attorney Patented Feb. 9, 1926.

1,572,004

UNITED STATES PATENT OFFICE.

JESSE A. GASKILL, OF IMBLER, OREGON.

WEEDING ATTACHMENT FOR HARROWS.

Application filed August 8, 1925. Serial No. 49,077.

*To all whom it may concern:*

Be it known that I, JESSE A. GASKILL, a citizen of the United States, residing at Imbler, in the county of Union and State of Oregon, have invented certain new and useful Improvements in Weeding Attachments for Harrows, of which the following is a specification, reference being had to the accompanying drawings.

This invention relates to weeding devices, and particularly to a weeding attachment for an ordinary spike harrow.

The general object of the invention is to provide an attachment in the form of a rod adapted to be mounted upon the harrow at the rear end thereof and be disposed on a level with the points of the harrow teeth, the object of the device being to operate through the harrowed earth and drag out all the weeds.

A further object is to provide a device of this character which will not obstruct the passage of trash and clods.

A still further object is to provide a device of this character which is very simple, which may be readily put in place or as readily removed, and which has been found to be thoroughly effective in practice.

My invention is illustrated in the accompanying drawing, wherein:—

Figure 1 is a side elevation of a harrow with my attachment applied thereto;

Figure 2 is a top plan view of the same;

Figure 3 is a perspective of one of the brackets or supports 17;

Figure 4 is a perspective view of the rod 16.

Referring to this drawing, it will be seen that I have illustrated an ordinary harrow formed in one or more sections, each section consisting of the longitudinal frame bars 10, the cross bars 11, and means whereby the cross bars which are oscillatably connected to the longitudinal bars may be tilted, a transversely extending draft bar 12, and a hitch 13. All of these parts are of any usual or suitable construction. In this form of harrow it is usual for the teeth or spikes 14 to be held upon the transverse oscillatory bars by means of an adjustable tooth clip 15.

My invention comprises a transversely extending rod or bar 16 which extends loosely through eyes formed in the lower ends of upwardly extending supporting rods 17, the upper ends of these rods being turned forward and downward, as at 18, and adapted to be inserted in the rear cross bar 11 taking the place of the harrow teeth in this rear cross bar. These upwardly extending members 17 are of sufficient length so that when the bar 16 is in place it will be disposed about six inches back of the last row of harrow teeth, with the bar 16 disposed at a depth equal to the level of the points of the harrow teeth. Preferably there will be three or more of these supporting bars, brackets or rods 17, depending on the size of the section of harrow that the attachment is connected with. The lower extremities of these members 17 are flattened and perforated to form eyes through which the rod 16 passes, this rod being preferably three-sixteenths of an inch in diameter and preferably both ends of the rod are slightly bent, as at 19, so that the rod cannot work out of the teeth when in use.

In the use of this device, the harrow is drawn over the ground in the usual manner and the rod 16 plays over the uneven ground in the same manner as the harrow teeth themselves but acts to drag out all the weeds. At the same time inasmuch as this rod is located some six inches back of the last row of teeth on the harrow and is supported by supports 17 which are relatively wide apart, all trash and clods are permitted to pass over the rod 16 and between the supports therefor. At the same time this bar 16 will act to drag the weeds all out on top of the ground. It does not, however, pull the trash out of the plowed ground or collect the clods in lumps upon the plowed ground. Furthermore, the weeds which are pulled out by the rod 16 will clean off of the rod much better than where teeth or blades are used for this purpose and the rod leaves the surface smoother. It will be understood, of course, that the downwardly bent ends 18 of these supports 17 will engage in the clamps 15 or may engage through apertures formed in the ordinary cross bars of a harrow. The clamp 15 is then tightened so as to hold these supports 17 in place and against slippage. By making the rod 16 loose through the supports 17, it is possible for these supports to be adjusted to suit the apertures in the rear bar 11 or in the clips.

While I have illustrated this device as applied to a particular form of harrow, I do not wish to be limited to this as it is obvious that it might be applied to many other forms of harrow and that the harrow may be in one section or a plurality of sections as desired.

I claim:—

1. The combination with a harrow having downwardly depending teeth, a transversely extending series of socket members carried at the rear end of the harrow, of a weeding attachment comprising a transversely extending rod, supports therefor extending upward, forward and then downward and engaged in said socket members, the rod being loosely mounted within the lower ends of said supports to permit the supports to be adjusted upon the rod to suit the socket members on the harrow.

2. A weeding attachment for harrows comprising a plurality of vertical supports, each support at its upper end being forwardly and then downwardly turned, the downwardly turned portion being adapted to be inserted in the tooth opening of a transverse bar of the harrow, the lower rear ends of said supports being transversely perforated, and a weeding rod loosely mounted within said perforations of the supports whereby the supports may be shifted upon the weeding rod, the ends of the weeding rod being formed to prevent the withdrawal of the supports therefrom.

3. A harrow including a transverse bar with clamping members mounted upon the bar and having vertically disposed openings, approximately U-shaped supports, each having a forward leg disposed through the openings of a corresponding clamping bar, the rear end of each of said supports having a transverse aperture, and a transverse rod loosely mounted in said apertures of the several supports whereby the supports may be adjusted longitudinally with relation to the rod, the rod having means for preventing the accidental detachment of the rod from said supports.

In testimony whereof I hereunto affix my signature.

JESSE A. GASKILL.